(12) United States Patent
Chen et al.

(10) Patent No.: US 11,562,646 B2
(45) Date of Patent: Jan. 24, 2023

(54) MULTIPLE LANE REAL-TIME TRAFFIC MONITOR AND VEHICLE ANALYSIS USING DISTRIBUTED FIBER SENSING

(71) Applicant: NEC Laboratories America, Inc., Princeton, NJ (US)

(72) Inventors: Yuheng Chen, South Brunswick, NJ (US); Ming-Fang Huang, Princeton, NJ (US); Ting Wang, West Windsor, NJ (US); Jingnan Zhao, Edison, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/221,836

(22) Filed: Apr. 4, 2021

(65) Prior Publication Data

US 2021/0312802 A1 Oct. 7, 2021

Related U.S. Application Data

(60) Provisional application No. 63/006,209, filed on Apr. 7, 2020.

(51) Int. Cl.
*G08G 1/04* (2006.01)
*G08G 1/01* (2006.01)
*G06N 20/00* (2019.01)
*G01H 9/00* (2006.01)

(52) U.S. Cl.
CPC ............... *G08G 1/04* (2013.01); *G01H 9/006* (2013.01); *G06N 20/00* (2019.01); *G08G 1/0125* (2013.01); *G08G 1/0145* (2013.01)

(58) Field of Classification Search
CPC ........ G01H 9/004; G01H 9/006; G06N 20/00; G08G 1/0125; G08G 1/0145; G08G 1/04
See application file for complete search history.

(56) References Cited

U.S. PATENT DOCUMENTS

| | | | |
|---|---|---|---|
| 2004/0061628 A1* | 4/2004 | Hill .......................... | G08G 1/02 340/933 |
| 2012/0230629 A1* | 9/2012 | Hill ..................... | G01D 5/35348 385/12 |

FOREIGN PATENT DOCUMENTS

CN 107256635 A * 10/2017 ............. G08G 1/017

* cited by examiner

*Primary Examiner* — Sisay Yacob
(74) *Attorney, Agent, or Firm* — Joseph Kolodka

(57) ABSTRACT

An advance in the art is made according to aspects of the present disclosure directed to distributed fiber optic sensing systems (DFOS), methods, and structures that advantageously monitor and identify—in real-time—roadway traffic and patterns across a multiple-lane highway by employing a multiple-transverse fiber optic cable arrangement of optical fiber cable positioned under the highway/roadway to detect, monitor, and/or identify traffic.

7 Claims, 3 Drawing Sheets

Lane 1

Lane 2

Lane 3

Lane 4

MULTIPLE LANE REAL-TIME TRAFFIC MONITOR AND VEHICLE ANALYSIS USING DISTRIBUTED FIBER SENSING

CROSS REFERENCE

This disclosure claims the benefit of U.S. Provisional Patent Application Ser. No. 63/006,209 filed 7 Apr. 2020 the entire contents of which is incorporated by reference as if set forth at length herein.

TECHNICAL FIELD

This disclosure relates generally to distributed fiber optic sensing (DFOS) techniques as applied to real-time traffic monitoring and traffic analysis.

BACKGROUND

The ability to monitor roadway traffic and patterns has long been known to be an important aspect of contemporary transportation planning and safety. Given this importance—systems, methods, and structures that may continuously monitor and report roadway traffic conditions—particularly across multiple-lane highways—would continue to be a welcome addition to the art.

SUMMARY

An advance in the art is made according to aspects of the present disclosure directed to distributed fiber optic sensing systems (DFOS), methods, and structures that advantageously monitor and identify—in real-time—roadway traffic and patterns across a multiple-lane highway.

According to aspects of the present disclosure—and in sharp contrast to the prior art—system, methods, and structures according to aspects of the present disclosure utilize a multiple-transverse fiber optic cable arrangement of optical fiber cable positioned under the highway/roadway to detect, monitor, and/or identify traffic.

BRIEF DESCRIPTION OF THE DRAWING

A more complete understanding of the present disclosure may be realized by reference to the accompanying drawing in which.

DESCRIPTION

Figure 1:
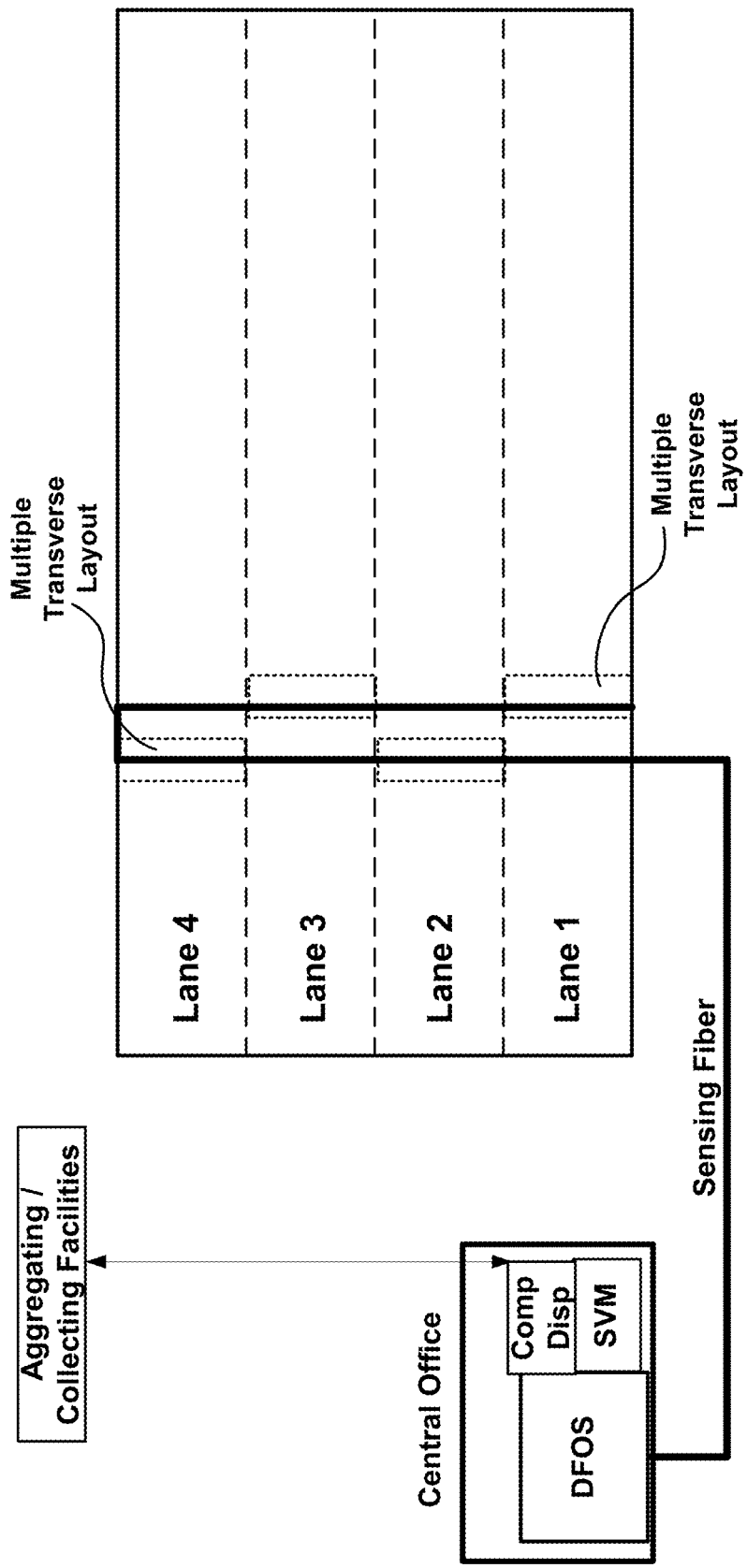
FIG. 1 is a schematic diagram illustrating a layout of an illustrative multiple transverse optical fiber cable according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to a DFOS interrogator/system. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

As we have noted, traffic monitoring and management is an important activity in contemporary society. In particular, the number of vehicles, vehicle speed, and axle configuration are critical factors considered for the location and design of roadways and its pavement. In order to effectively design and manage highways—particularly for a multilane highway—it is necessary to consider traffic volume and its distribution across the multilane highway. Note that lane distribution factors are determined according to regulations and roadway design manuals, which generally make numerous assumptions of traffic and its distribution across the multiple lanes of a multilane highway. To optimize a highway design, maintenance, and rehabilitation—including pavement—it is necessary and essential to accurately monitor and count traffic and types of traffic on the multi-lane highway—particularly after its initial construction.

Traffic monitoring and counting using pneumatic tubes is a common technique employed to count and classify traffic for short-term collections, but it is not suitable for future applications including a smart infrastructure. Video recording is another commonly used technique to detect and classify vehicles, but it requires a large storage of image data and needs complicated post-processing after collection. Therefore, alternative traffic monitoring and counting approaches—particularly for multilane roadways and which are suitable for future application in smart infrastructure—remains of particular interest in the art.

As we shall show and describe a distributed fiber optic sensing (DFOS) according to aspects of the present disclosure allows us to collect traffic data in real-time and to construct communications between a roadway and vehicle in a smart infrastructure system.

Operationally, a DFOS system resolves the distribution of vibrational disturbance along an optical fiber. For an application of long-distance traffic monitoring, for example, a working distance is greater than 25 km, the spatial resolution is unfortunately not high enough to resolve vehicles running in different driving lanes.

To cure this deficiency, systems, methods, and structures according to aspects of the present disclosure employ a multiple-transverse (i.e., folded, serpentine) cable assembly to increase spatial resolution.

FIG. 1 is a schematic diagram illustrating a layout of an illustrative multiple transverse optical fiber cable according to aspects of the present disclosure. As may be observed from that figure, which is an overhead view of a multilane roadway, a DFOS system located—for example in a central office—includes a fiber optic cable (sensing fiber) that is deployed transversely underneath all of the multiple lanes of the Under each of the individual lanes, the fiber is positioned in a multiple transverse layout.

Figure 2:
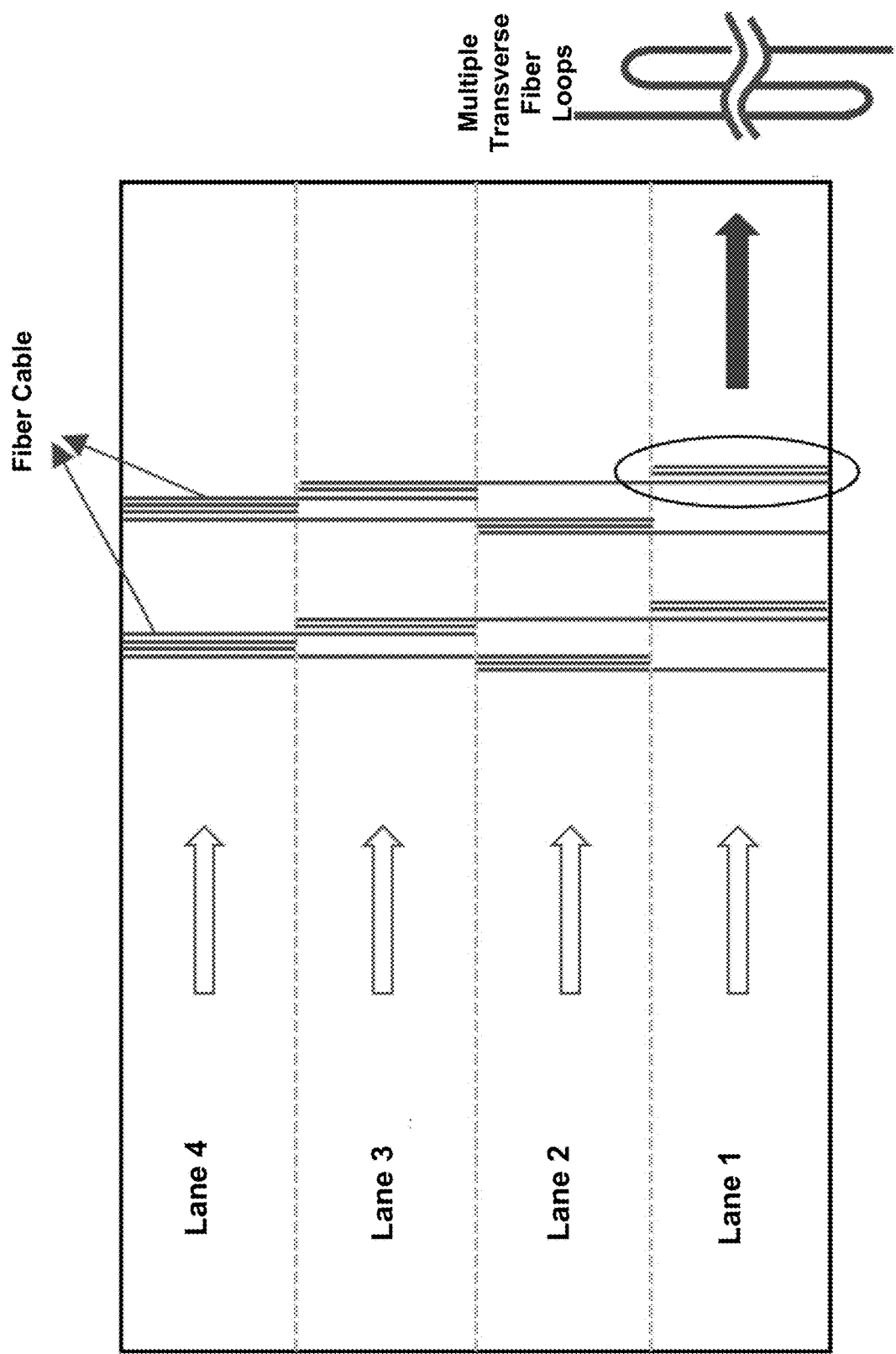
FIG. 2 is a schematic diagram illustrating a layout of an illustrative multiple transverse optical fiber cable illustrating formation of illustrative multiple transverse fiber arrangement according to aspects of the present disclosure.

Such multiple transverse layout may be further understood by simultaneously referencing FIG. 2. As illustratively shown in that figure, where the fiber cable is positioned under a particular lane of the multilane roadway, a multiple loop or transverse "serpentine" (folded) pattern is formed. In this manner a section of optical fiber is looped back and forth so that multiple sensing areas of the fiber are located under a single lane of the roadway. In this inventive manner, specific "high fiber density" sensing regions may be formed under predetermined areas of roadway for enhancing the sensitivity of the region.

Figure 3:
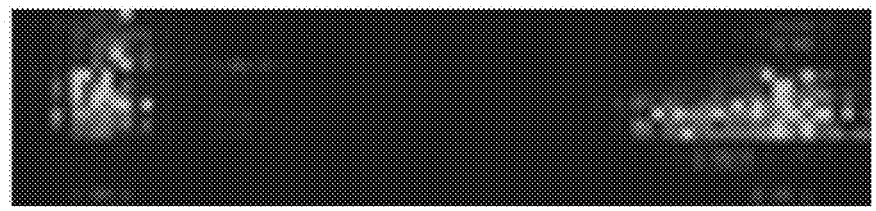
FIG. 3 is a series of encoding patterns illustrating vehicle passage on a multi-lane roadway according to aspects of the present disclosure.
Figure 3:
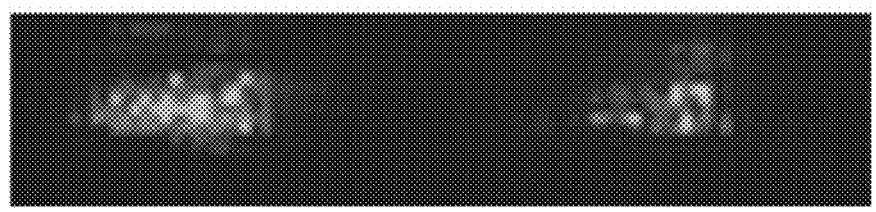
Figure 3:
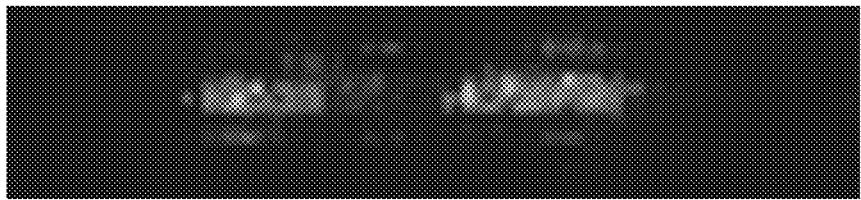
Figure 3:
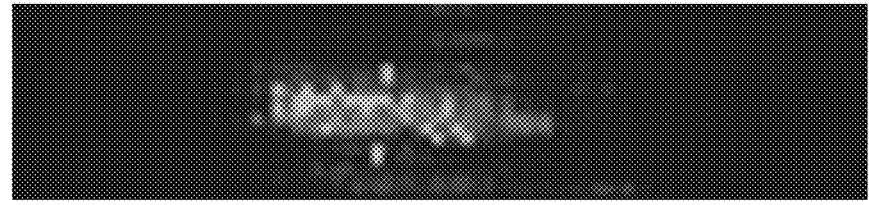

FIG. 3 is a series of encoding patterns illustrating vehicle passage on a multi-lane roadway according to aspects of the present disclosure. When the fiber optic cable is deployed transversely across the multilane highway as illustrated, a pattern of DFOS waterfall plots is produced from vehicle(s) driving on the multilane roadway. on different lanes. The pattern may be classified by Support Vector Machine based algorithm and registered as event of vehicle pass through specific lane. Since the pattern is generated by single vehicle axle. The vehicle axle configuration, namely axle number, distance etc., could be derived and vehicle category can be identified.

Advantageously, and as illustratively shown in FIG. 2, at least two parallel transverse cable assemblies may be deployed, and by measuring the time delay of a pattern occurrence on a waterfall plot, a vehicle instant speed and axle configuration may be determined. Of further advantage, the multiple transverse optical cable as shown also has capability to classify the axle weight of vehicle.

Unlike traffic counter based on pneumatic tube, the sensing cable is located under a roadway pavement, thus there is no disturbance to traffic flow with the added benefit that the sensing element is "protected" by the overlying roadway and therefore exhibits a much longer useful lifetime. Note that at the sensing location, no electrical power is needed and any material cost for additional deployment on multiple locations along roadway is negligible.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of operating a distributed optical fiber sensing system for multiple-lane, real-time traffic monitoring and vehicle analysis, said system comprising:
   a length of optical fiber; and
   a distributed optical fiber sensing interrogator in optical communication with the length of optical fiber, wherein at least a portion of said optical fiber is positioned under a multiple-lane roadway/highway and arranged in a multiple transverse arrangement;
   said method comprising:
   operating the distributed optical fiber sensing interrogator to determine vibration sources at one or more points along the length of the optical fiber; and
   associating the vibration sources with vehicular traffic on the highway roadway;
   wherein different portions of the length of optical fiber cable exhibit different multiple-transverse arrangements that correspond to different lanes of the multiple-lane roadway/highway; and
   each multiple-transverse arrangement of optical fiber cable exhibits a folded or serpentine pattern—winding or turning one way and another—such that multiple segments/sections of the fiber underlie a section of the roadway and the fiber does not cross over or overlie or underlie itself.

2. The method of claim 1 further comprising generating one or more waterfall plots indicative of vibrations across the multiple-lanes of the highway/roadway.

3. The method of claim 2 further comprising:
   detecting a location of a vehicle on the highway roadway using predictive models produced by machine learning methods.

4. A distributed fiber optic sensing (DFOS) system for multiple-lane, real-time traffic monitoring and vehicle analysis, said system comprising:
   a DFOS interrogator system in optical communication a length of optical fiber cable positioned under a multiple-lane roadway/highway;

wherein at least a portion of the length of optical fiber cable positioned under the multiple-lane roadway/highway is arranged in a multiple-transverse arrangement, and that different portions of the length of optical fiber cable exhibit different multiple-transverse arrangements that correspond to different lanes of the multiple-lane roadway/highway; and each multiple-transverse arrangement of optical fiber cable exhibits a folded or serpentine pattern—winding or turning one way and another—such that multiple segments/sections of the fiber underlie a section of the roadway and the fiber does not cross over or overlie or underlie itself.

5. The DFOS system of claim 4 further comprising an intelligent analyzer configured to analyze DFOS sensing data received by the DFOS interrogator system.

6. The DFOS system of claim 5 wherein distributed fiber optic sensing data and telecommunications data coexist simultaneously on one or more lengths of the optical fiber.

7. The DFOS system of claim 6 wherein DFOS data is one or more selected from the group consisting of distributed vibration sensing, distributed temperature sensing, distributed vibration/acoustic sensing.

\* \* \* \* \*